(12) United States Patent
Kobayashi et al.

(10) Patent No.: US 8,360,930 B2
(45) Date of Patent: Jan. 29, 2013

(54) CLUTCH CONTROL DEVICE

(75) Inventors: Fuyuki Kobayashi, Saitama (JP);
Kohsaku Murohashi, Saitama (JP);
Katsuhiro Kunikiyo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1407 days.

(21) Appl. No.: 12/019,273

(22) Filed: Jan. 24, 2008

(65) Prior Publication Data
US 2008/0182720 A1    Jul. 31, 2008

(30) Foreign Application Priority Data
Jan. 30, 2007    (JP) .................................. 2007-019247

(51) Int. Cl.
*B60W 10/02*    (2006.01)
*B60W 10/08*    (2006.01)

(52) U.S. Cl. ........................................................ 477/83

(58) Field of Classification Search ................ None
See application file for complete search history.

(56) References Cited

U.S. PATENT DOCUMENTS
5,707,318 A * 1/1998 Shimei et al. ................. 477/133
2006/0191766 A1* 8/2006 Konukiyo et al. ............. 192/86

FOREIGN PATENT DOCUMENTS
JP    2003-294062 A    10/2003

* cited by examiner

*Primary Examiner* — David D Le
*Assistant Examiner* — Erin D Bishop
(74) *Attorney, Agent, or Firm* — Birch, Stewart, Kolasch & Birch, LLP

(57) ABSTRACT

A clutch control device for obtaining a good shift shock reducing effect regardless of a change in clutch engagement point. A target NeV database stores a target NeV map as a target value of the ratio between an engine speed (Ne) and a vehicle speed (V) obtained from the engine speed after primary speed reduction by a gear transmission. The time period from the time of detection of a downshift operation to the time of completion of the reengagement of the clutch is composed of a first period until the clutch becomes a partially engaged condition after disengagement of the clutch, a second period during which the partially engaged condition is maintained, and a third period from the time when the clutch in the partially engaged condition starts to be driven in its engaging direction to the time when the reengagement of the clutch is completed.

18 Claims, 9 Drawing Sheets

CLUTCH CONTROL DEVICE

CROSS-REFERENCE TO RELATED APPLICATIONS

The present application claims priority under 35 USC 119 to Japanese Patent Application No. 2007-019247 filed on Jan. 30, 2007 the entire contents of which are hereby incorporated by reference.

BACKGROUND OF THE INVENTION

1. Field of the Invention

The present invention relates to a clutch control device, and more particularly to a clutch control device which can always obtain a good shift shock reducing effect regardless of a change in clutch engagement point.

2. Description of Background Art

An automatic clutch device is known wherein a clutch for connecting and disconnecting the transmission of a drive force between an engine and a transmission is driven by an actuator Japanese Patent Laid-Open No. 2003-294062 discloses a control method for a clutch in the case of disengaging the clutch by driving an actuator, next performing a downshift operation, and next reengaging the clutch by driving the actuator, wherein an operational condition of engine brake is estimated according to various parameters indicative of a vehicle operating condition, and the actuator is driven so that the strength of the engine brake falls within a proper range. The various parameters indicative of the vehicle operating condition are set to a throttle valve opening angle and a front wheel brake oil pressure, or an engine speed and a gear position, for example. The actuator is driven according to these parameters so that the clutch is not engaged rapidly, thereby suppressing shift shock in downshifting.

However, in the technique disclosed in Japanese Patent Laid-Open No. 2003-294062, the strength of the engine brake is estimated according to the various parameters, and the amount of operation of the actuator is controlled according to an estimated value for the strength of the engine brake. Accordingly, when a clutch engagement point (meet point) becomes different from an initial position due to thermal expansion or wear of the clutch disks, there is a possibility that the same shift shock reducing effect as that in the initial condition cannot be obtained in spite of the same control.

SUMMARY AND OBJECTS OF THE INVENTION

It is accordingly an object of the present invention to provide a clutch control device which can always obtain a good shift shock reducing effect regardless of a change in clutch engagement point.

In accordance with an embodiment of the present invention, there is provided a clutch control device having a clutch provided between an engine and a transmission for connecting and disconnecting the transmission of a drive force, an actuator for driving the clutch, and shift operation detecting means for detecting a shift operation by a rider. The clutch control device includes engine speed detecting means for detecting an engine speed, vehicle speed detecting means for detecting a vehicle speed according to the engine speed after primary speed reduction by the transmission and a clutch control portion for disengaging the clutch when a downshift operation by the rider is detected by the shift operation detecting means and for performing feedback control of the actuator so that the ratio of the engine speed and the vehicle speed becomes a predetermined target value in reengaging the clutch after completing the downshifting of the transmission.

In accordance with an embodiment of the present invention, the predetermined target value is set by a clutch engagement control map showing variations in the ratio of the engine speed to the vehicle speed with the elapse of time. The clutch engagement control map being provided for each target gear position.

In accordance with an embodiment of the present invention, the time period from the time when the downshift operation is detected by the shift operation detecting means to the time when the clutch is reengaged after completing the downshifting of the transmission includes a first period from the time when the disengagement operation of the clutch is started to the time when the clutch is driven in its engaging direction at a predetermined speed corresponding to a gear position after completing the disengagement of the clutch until reaching a partially engaged condition of the clutch; a second period during which the partially engaged condition is maintained by the feedback control and a third period from the time when the clutch in the partially engaged condition starts to be driven in the engaging direction at a predetermined speed corresponding to a gear position to the time when the reengagement of the clutch is completed, the second period being started at the time when the ratio of the engine speed to the vehicle speed has reached a first predetermined ratio and ends at the time when the ratio of the engine speed to the vehicle speed has reached a second predetermined ratio higher than the first predetermined ratio.

In accordance with an embodiment of the present invention, the clutch control device includes the engine speed detecting means for detecting an engine speed, the vehicle speed detecting means for detecting a vehicle speed according to the engine speed after primary speed reduction by the transmission, and the clutch control portion for disengaging the clutch when a downshift operation is detected by the shift operation detecting means and for performing feedback control of the actuator so that the ratio of the engine speed to the vehicle speed becomes a predetermined target value in reengaging the clutch after completing the downshifting of the transmission. Thus, clutch engagement control is performed according to the ratio of a present engine speed to a present vehicle speed, from which ratio an actual slip ratio of the clutch can be obtained. Accordingly, even when the engagement point (meet point) of the clutch changes due to thermal expansion or wear of the clutch disks, a constant shift shock reducing effect can be always obtained.

In accordance with an embodiment of the present invention, the predetermined target value is set by the clutch engagement control map showing variations in the ratio of the engine speed to the vehicle speed with the elapse of time, and this clutch engagement control map is provided for each target gear position. Accordingly, optimum clutch engagement control can be executed for each gear position. Further, the clutch engagement control map can be arbitrarily set, so that it is possible to execute optimum clutch engagement control responsive to changes in weight of the vehicle and rider and changes in tire grip force due to tire wear, road surface temperature, etc.

In accordance with an embodiment of the present invention, the second period during which the partially engaged condition is maintained by the feedback control is started at the time when the ratio of the engine speed to the vehicle speed has reached the first predetermined ratio and ends at the time when the ratio of the engine speed to the vehicle speed has reached the second predetermined ratio higher than the first predetermined ratio. Accordingly, the determination of the starting time and the ending time of the second period can be made simple, so that the load on the clutch control portion can be reduced to make the feedback control easier.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
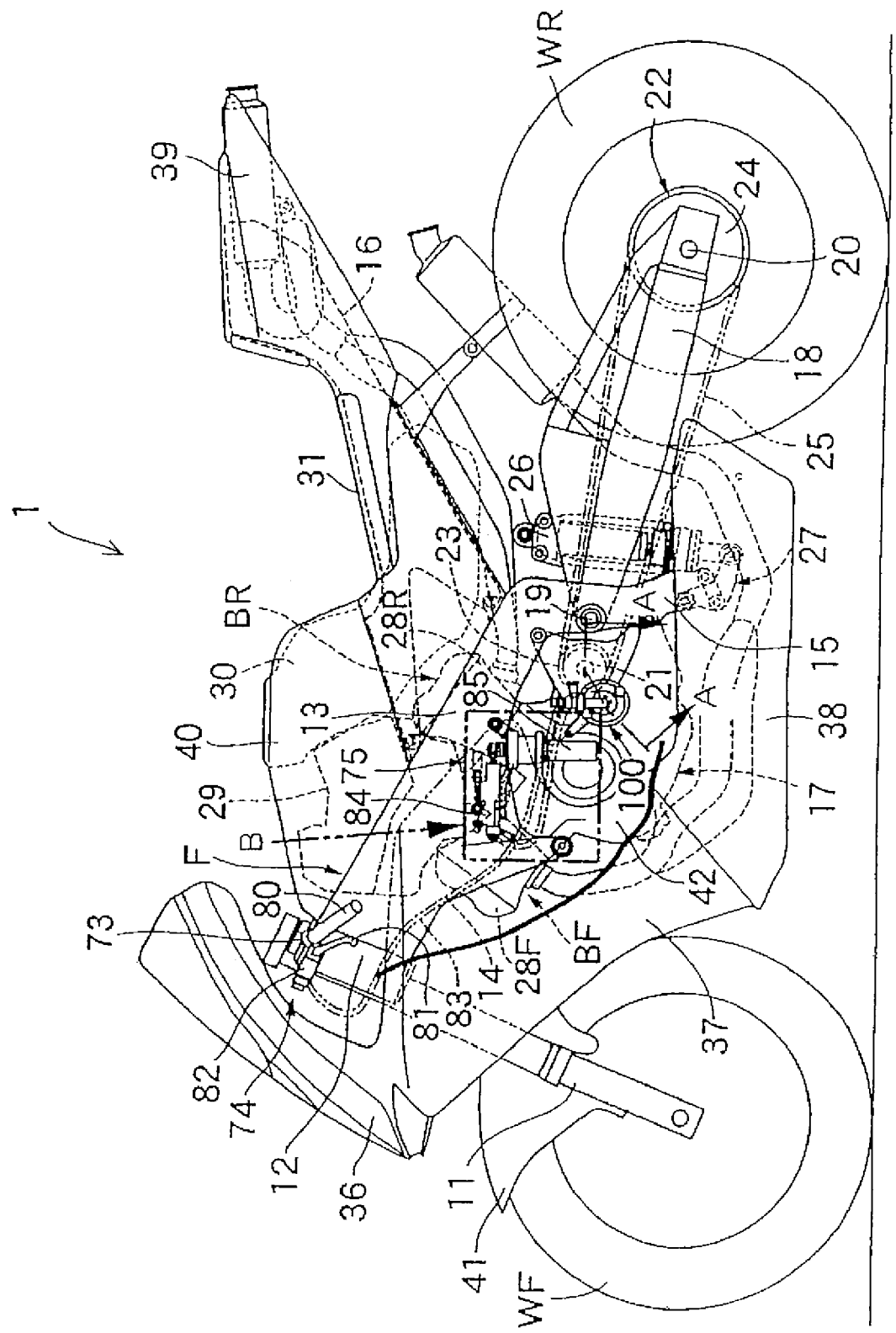
FIG. 1 is a side view of a motorcycle according to a preferred embodiment of the present invention.

A preferred embodiment of the present invention will now be described in detail with reference to the drawings. FIG. 1 is a side view of a motorcycle adopting a clutch control device according to a preferred embodiment of the present invention. The motorcycle 1 has a body frame F, which includes a head pipe 12 for steerably supporting a front fork 11 for rotatably supporting a front wheel WF, a pair of right and left main frames 13 extending rearwardly from the head pipe 12 so as to be inclined downwardly, a pair of right and left engine hangers 14 welded to the head pipe 12 and the front portions of the right and left main frames 13 and extending downwardly from the main frames 13, a pair of right and left pivot plates 15 extending downwardly from the rear portions of the right and left main frames 13, and a rear frame 16 connected to the rear portions of the main frames 13 and extending rearwardly therefrom so as to be inclined upward.

A V-type engine 17 (e.g., V-type five-cylinder engine) having a front bank BF and a rear bank BR is supported to the lower portions of the engine handers 14, the intermediate portions of the main frames 13, and the upper and lower portions of the pivot plates 15. A swing arm 18 is pivotably supported at its front end portion through a shaft 19 to the vertically intermediate portions of the pivot plates 15, and an axle 20 of a rear wheel WR is rotatably supported to the rear end portions of the swing arm 18.

A gear transmission (see FIG. 2) having a counter shaft 21 is included in the engine 17, and the power output from the counter shaft 21 is transmitted through chain drive means 22 to the rear wheel WR. The chain drive means 22 is composed of a drive sprocket 23 fixed to the counter shaft 21, a driven sprocket 24 fixed to the rear wheel WR, and an endless drive chain 25 wrapped between the drive sprocket 23 and the driven sprocket 24. A rear shock absorber 26 is connected at its upper end portion to the front portion of the swing arm 18, and the lower end portion of the rear shock absorber 26 is connected through a link mechanism 27 to the lower portions of the pivot plates 15.

The front and rear banks BF and BR of the engine 17 include cylinder heads 28F and 28R, respectively. The cylinder heads 28F and 28R are mounted to a crankcase 42 of the engine 17. An air cleaner 29 is provided on the upper side of the cylinder heads 28F and 28R, and a fuel tank 30 is provided on the rear side of the air cleaner 29. The front side of the head pipe 12 is covered with a front cowl 36 formed of synthetic resin or the like, and the right and left sides of the front portion of the vehicle body are covered with a center cowl 37 continuously connected to the front cowl 36. Further, a lower cowl 38 for covering a part of the engine 17 on the right and left sides thereof is continuously connected to the center cowl 37. Further, the rear portion of the rear frame 16 is covered with a rear cowl 39, and a seat 31 for a rider is mounted to the rear cowl 39. Further, the upper portions of the fuel tank 30 and the air cleaner 29 are covered with a cover member 40. A front fender 41 for covering the upper side of the front wheel WF is mounted to the front fork 11.

The motorcycle 1 according to this preferred embodiment adopts a hydraulic clutch adapted to be operated by oil pressure. First oil pressure generating means 74 for generating oil pressure according to the operation by the rider is mounted on a steering handle 73. The first oil pressure generating means 74 is composed of a clutch lever 81 mounted near a grip 80 of the steering handle 73 and a clutch master cylinder 82 for generating oil pressure according to the operation of the clutch lever 81. The oil pressure output from the clutch master cylinder 82 is transmitted through a first pipe 83. The first pipe 83 may be formed of a flexible material capable of following the rotational operation of the steering handle 73.

A rectangular area B is provided in the vicinity of the engine 17 with second oil pressure generating means 75 for automatically generating oil pressure for driving the clutch according to an operational condition of the vehicle independently of the first oil pressure generating means 74 mentioned above. The second oil pressure generating means 75 is composed of an automatic control master cylinder 84 and an electric motor 85 as an actuator for driving the automatic control master cylinder 84. Clutch driving means 100 for converting the oil pressures generated by the first and second oil pressure generating means 74 and 75 into the motion of clutch disks is provided on a left side wall of the crankcase 42.

Figure 2:
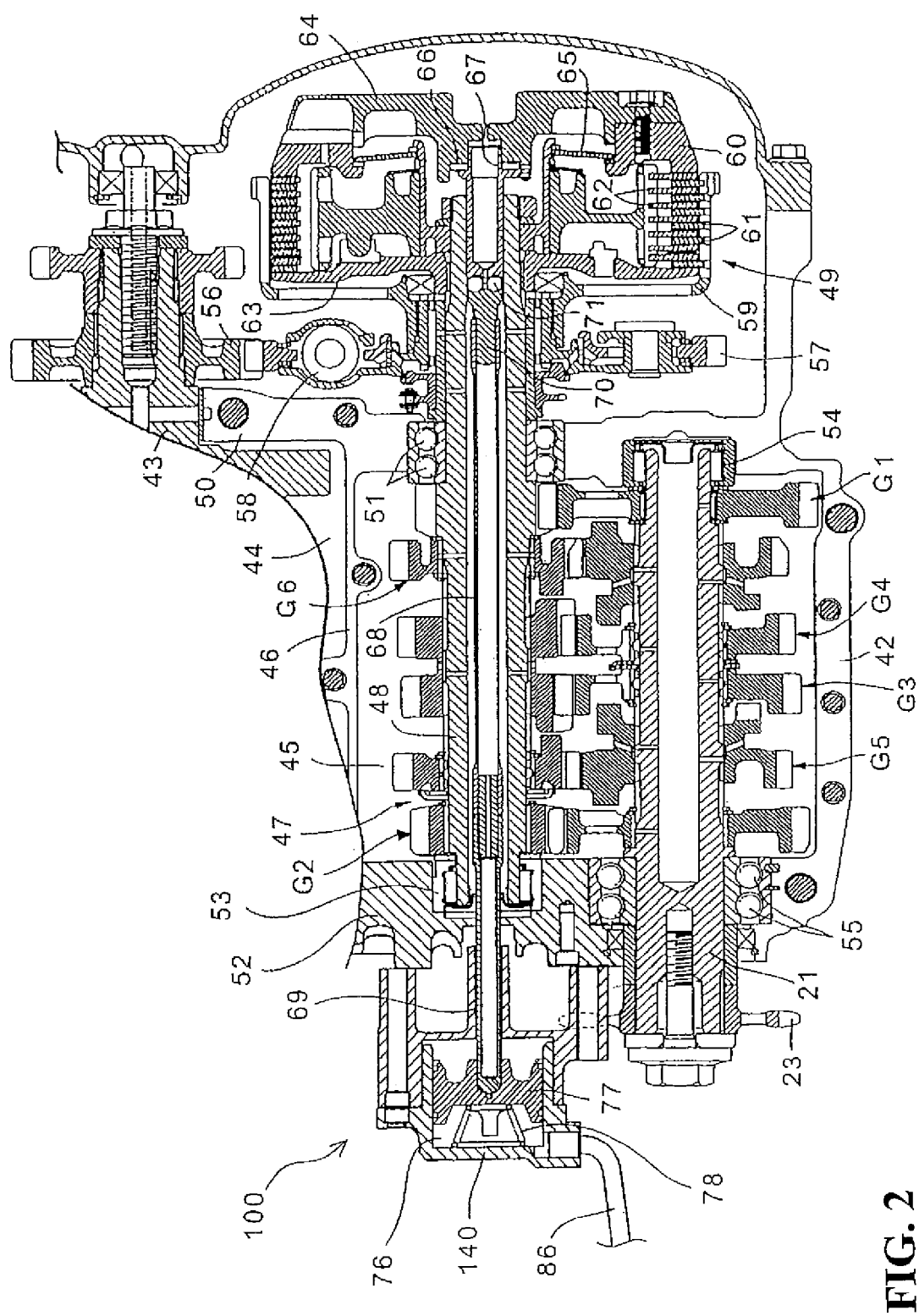
FIG. 2 is a cross section taken along the line A-A in FIG. 1.

FIG. 2 is a cross section taken along the line A-A in FIG. 1. In FIG. 2, the same reference numerals as those shown in FIG. 1 denote the same or like parts. A crankshaft 43 extending in the lateral direction of the vehicle is rotatably supported to the crankcase 42 of the engine 17. A crank chamber 44 for storing a large part of the crankshaft 43 is defined in the crankcase 42, and a transmission chamber 45 is defined on the rear lower side of the crank chamber 44 in the crankcase 42 in such a manner that a partition wall 46 is formed between the crank chamber 44 and the transmission chamber 45. A constant-mesh type gear transmission 47 is stored in the transmission chamber 45. The gear transmission 47 includes a main shaft 48 extending parallel to the crankshaft 43, the counter shaft 21 extending parallel to the main shaft 48, and first to sixth speed gear trains G1 to G6 provided between the main shaft 48 and the counter shaft 21. The counter shaft 21 is rotatably supported to the crankcase 42 and located on the rear side of the crankshaft 43. The power from the crankshaft 43 is input through a multidisk clutch 49 to the main shaft 48.

One end portion of the main shaft 48 extends through a right side wall 50 of the crankcase 42 and is rotatably supported through a bearing 51 to the right side wall 50. The other end portion of the main shaft 48 is rotatably supported through a bearing 53 to a left side wall 52 of the crankcase 42. One end portion of the counter shaft 21 is rotatably supported through a bearing 54 to the right side wall 50. The other end portion of the counter shaft 21 extends through the left side wall 52 and is rotatably supported through a bearing 55 to the left side wall 52. The drive sprocket 23 is mounted on the left end portion of the counter shaft 21 projecting out of the crankcase 42.

A primary drive gear 56 is relatively nonrotatably mounted on the right end portion of the crankshaft 43. An outer member 59 of the clutch 49 is relatively rotatably mounted on the main shaft 48. A primary driven gear 57 meshing with the primary drive gear 56 is relatively nonrotatably mounted on the outer member 59. The primary driven gear 57 is mounted through a damper spring 58 to the outer member 59.

The clutch 49 includes the outer member 59 rotatable relative to the main shaft 48, an inner member 60 rotating with the main shaft 48, a plurality of clutch plates 61 as one part of the clutch disks engaged with the inner circumferential portion of the outer member 59, a plurality of friction plates 62 as the other part of the clutch disks engaged with the outer circumferential portion of the inner member 60 in such a manner that each friction plate 62 is sandwiched between the adjacent clutch plates 61, a pressure receiving plate 63 stored in the outer member 59 and fixed to the main shaft 48, a release plate 64 connected to the inner member 60, and a clutch spring 65 for biasing the release plate 64 toward the pressure receiving plate 63. Each clutch plate 61 and each friction plate 62 arranged adjacent to each other are used as a pair of clutch disks, and for example, seven pairs of clutch disks are used in this preferred embodiment.

In the condition where the release plate 64 is moved to the left as viewed in FIG. 2 by the biasing force of the clutch spring 65, i.e., in the condition where no clutch operation is performed, the clutch 49 is in its engaged condition by the frictional forces of the clutch disks. On the other hand, when the release plate 64 is moved to the right as viewed in FIG. 2 against the biasing force of the clutch spring 65, the clutch disks are separated from each other to remove the frictional forces, so that the transmission of the drive force from the crankshaft 43 to the main shaft 48 is cut off.

The main shaft 48 is a hollow cylindrical member, and a push rod 67 is slidably inserted in the main shaft 48 at its right end portion in such a manner that the right end portion of the push rod 67 abuts against the central portion of the release plate 64 through a hearing 66. Further, a cylindrical transmitting rod 68 is axially reciprocatably inserted in the main shaft 48 in such a manner that one end of the transmitting rod 68 is connected to the push rod 67. Another transmitting rod 69 is axially reciprocatably inserted in the main shaft 48 in such a manner that one end of the transmitting rod 69 is connected to the other end of the transmitting rod 68. A push member 70 is fixed to the right end of the transmitting rod 68 and is connected through a plurality of spherical members 71 to the other end of the push rod 67. With this arrangement, the clutch 49 can be engaged or disengaged by axially driving the transmitting rods 68 and 69.

The left end portion of the transmitting rod 69 for driving the clutch 49 projects from the main shaft 48 and slidably extends through the left side wall 52 of the crankcase 42. A hydraulic clutch piston 77 abuts against the left end of the transmitting rod 69 in such a manner that one surface of the hydraulic clutch piston 77 is exposed to a hydraulic chamber 76 formed in a support case 140 of the clutch driving means 100. The hydraulic clutch piston 77 is slidable to the right as viewed in FIG. 2 by the oil pressure input from a second pipe 86 into the hydraulic chamber 76. When an oil pressure larger than the biasing force of the clutch spring 65 is input from the second pipe 86 into the hydraulic chamber 76, the hydraulic clutch piston 77 is moved by the oil pressure to the right to drive the transmitting rods 68 and 69. A spring 78 is provided in the hydraulic chamber 76, so as to exert a minimum biasing force for maintaining the abutment of the hydraulic clutch piston 77 against the transmitting rod 69 so that the input oil pressure can be losslessly converted into the motion of the transmitting rod 69.

Figure 3:
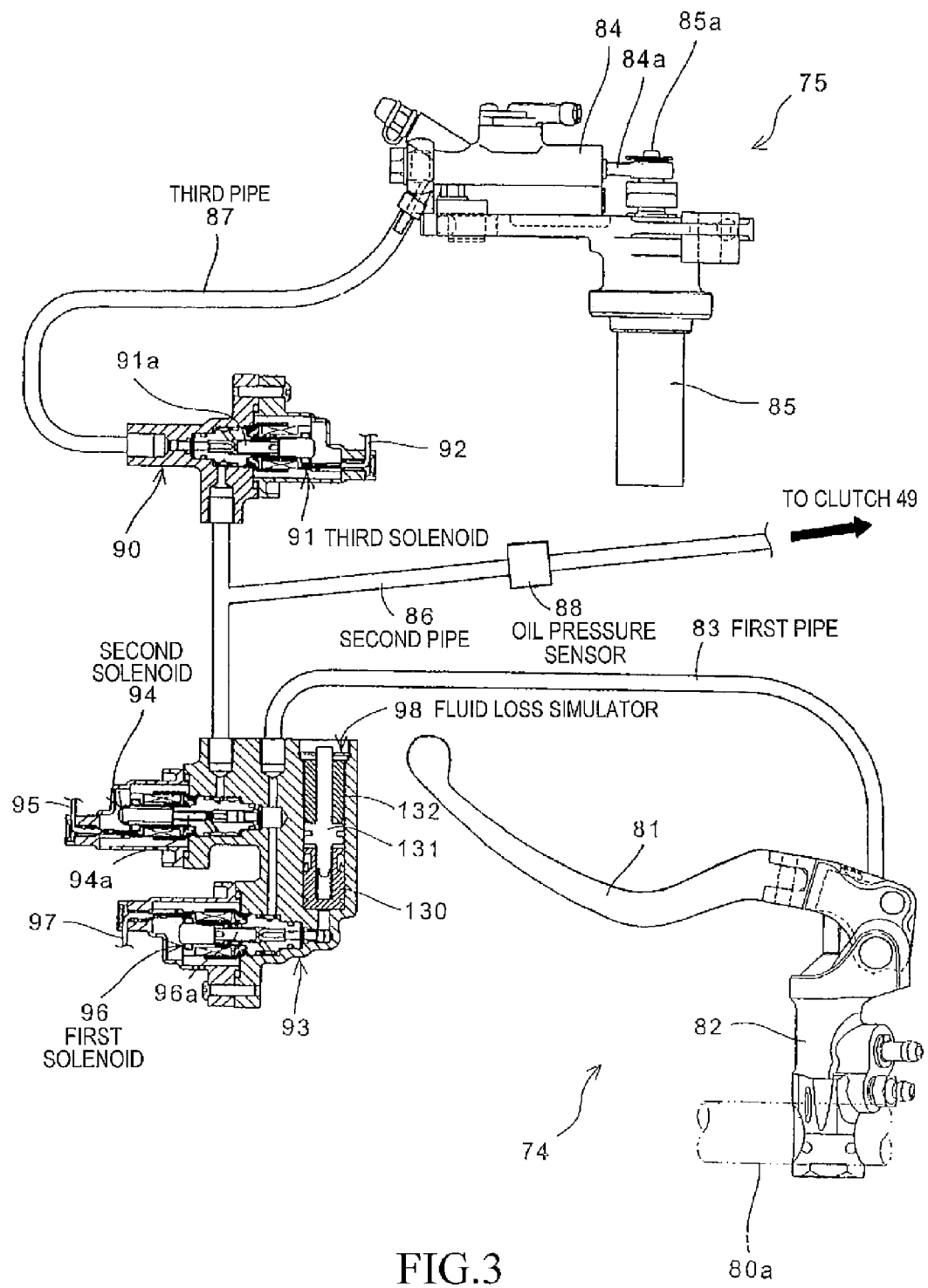
FIG. 3 is a diagrammatic view showing the configuration of a hydraulic clutch driving system according to this preferred embodiment.
Figure 4:
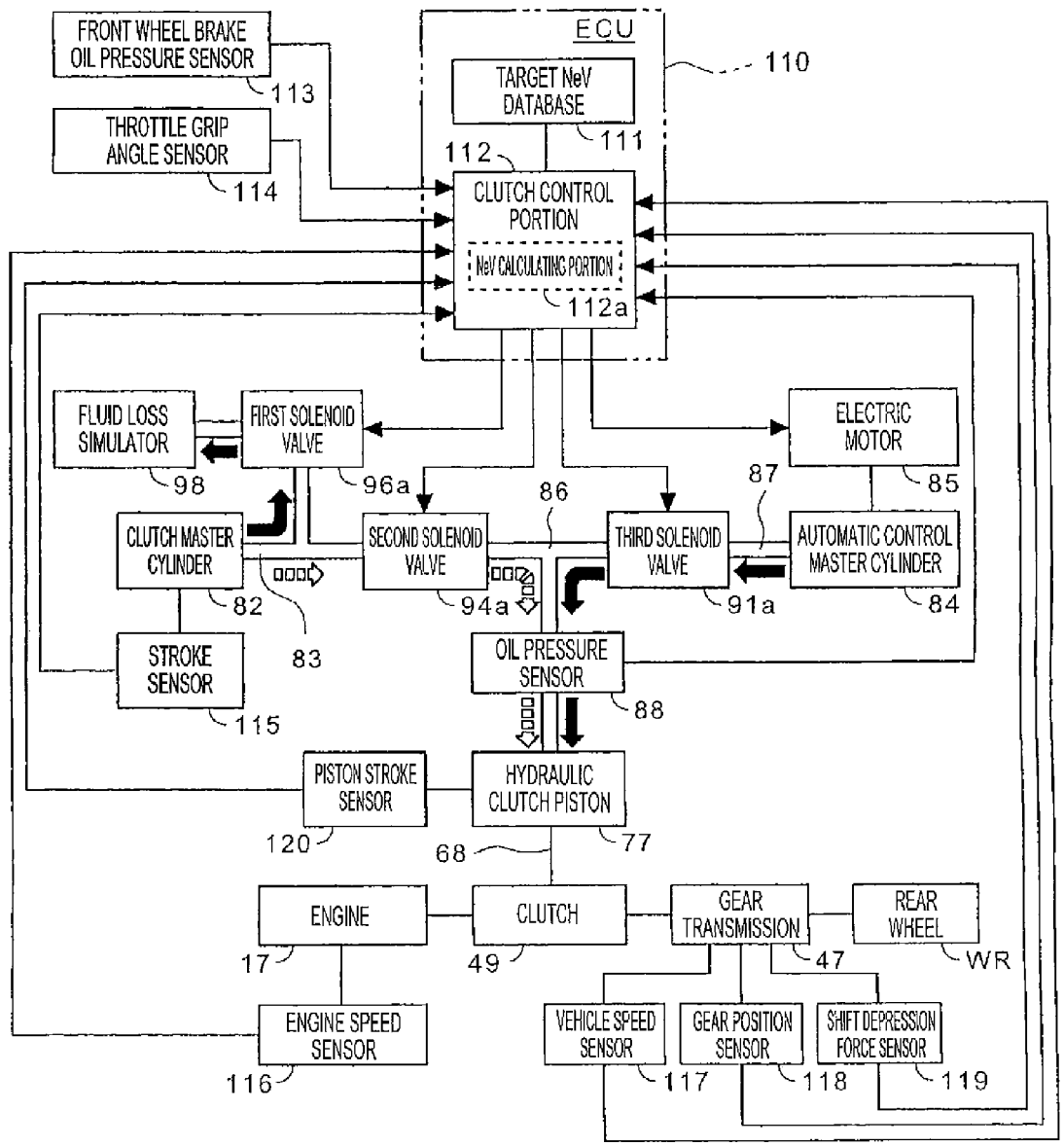
FIG. 4 is a block diagram showing the configuration of a clutch control device according to this preferred embodiment.

FIG. 3 is a diagrammatic view showing the configuration of a hydraulic clutch driving system according to this preferred embodiment. FIG. 4 is a block diagram showing the configuration of the clutch control device according to this preferred embodiment. in FIGS. 3 and 4, the same reference numerals as those shown in FIGS. 1 and 2 denote the same or like parts. The hydraulic clutch driving system according to the present embodiment is configured to drive the clutch 49 by using the oil pressure generated from the second oil pressure generating means 75 as far as no abnormality occurs in the system.

The clutch master cylinder 82 of the first oil pressure generating means 74 is fixed to a handle bar 80*a* on which the grip 80 is mounted. The clutch master cylinder 82 generates oil pressure when the rider operates the clutch lever 81, and this oil pressure is transmitted through the first pipe 83 to a fluid loss simulator unit 93. The fluid loss simulator unit 93 includes a fluid loss simulator 98, a first solenoid 96, and a second solenoid 94. The first solenoid 96 includes a solenoid valve 96*a* adapted to be driven according to a drive signal input from a wire 97, thereby allowing the switching between the connection and disconnection of the first pipe 83 and the fluid loss simulator 98. Similarly, the second solenoid 94 includes a solenoid valve 94*a* adapted to be driven according to a drive signal input from a wire 95, thereby allowing the switching between the connection and disconnection of the first pipe 83 and the second pipe 86.

The fluid loss simulator 98 is composed of a hydraulic piston 130 stored in a hydraulic chamber, a push member 131 for transmitting a sliding operation of the hydraulic piston 130, and an elastic member 132 adapted to be pushed by the push member 131. When the oil pressure generated by the first oil pressure generating means 74 is input into the fluid loss simulator 98, the hydraulic piston 130 is slid by this oil pressure to deform the elastic member 132, and an elastic force generated as a resultant force against the deformation of the elastic member 132 functions to resist the operation of the clutch lever 81. With this configuration, when the clutch lever 81 is operated by the rider in normal running, the clutch 49 is driven by the oil pressure generated by the electric motor 85, and the oil pressure generated by the clutch master cylinder 82 is used in the fluid loss simulator 98 to simulatively give the rider a resistance to the clutch operation.

The second oil pressure generating means 75 is configured to generate an oil pressure for automatic control by outputting a drive force of the electric motor 85 through a speed reduction mechanism to a drive shaft 85a and pushing a piston in the cylindrical automatic control master cylinder 84 through a push rod 84a connected to the drive shaft 85a. The oil pressure generated by the automatic control master cylinder 84 is transmitted through a third pipe 87 to an oil passage selector unit 90 including a third solenoid 91. The third solenoid 91 includes a solenoid valve 91a adapted to be driven according to a drive signal input from a wire 92, thereby allowing the switching between the connection and disconnection of the third pipe 87 and the second pipe 86. The second pipe 86 is provided with an oil pressure sensor 88 for detecting an oil pressure in the second pipe 86. Further, the clutch master cylinder 82 and the automatic control master cylinder 84 are respectively provided with stroke sensors (not shown) for detecting the respective piston strokes.

Referring to FIG. 4, an ECU 110 (engine control unit) is mounted on the motorcycle 1. The ECU 110 includes a clutch control unit 112 having an NeV calculating portion 112a and a target NeV database 111, where "NeV" stands for a value obtained by dividing an engine speed by a vehicle speed. The value for NeV during operation of the motorcycle 1 is always calculated by the NeV calculating portion 112a according to output signals from an engine speed sensor 116 for detecting the rotational speed of the crankshaft 43 (see FIG. 2) of the engine 17 and a vehicle speed sensor 117 as vehicle speed detecting means mounted on the gear transmission 47. The vehicle speed of the motorcycle 1 can be calculated from a secondary speed reduction ratio by the chain drive means 22 and the outer diameter of the rear wheel WR under the condition that the engine speed after primary speed reduction by the gear transmission 47 has been detected. Accordingly, the mounting position of the vehicle speed sensor 117 may be set near the counter shaft 21 or the driven sprocket 24, for example. Further, since NeV means the ratio of an actual engine speed to an actual vehicle speed, an actual slip ratio of the clutch 49 can be obtained in consideration of a primary speed reduction ratio. The target NeV database 111 preliminarily stores a plurality of target NeV maps to be used in performing clutch engagement control for reducing shift shock in downshifting.

Output signals from a front wheel brake oil pressure sensor 113 and a throttle grip angle sensor 114 are input into the clutch control portion 112. Further, output signals from a piston stroke sensor 120 for detecting the stroke of the hydraulic clutch piston 77 and a stroke sensor 115 for detecting the stroke of the clutch master cylinder 82 are also input into the clutch control portion 112. Further, output signals from a gear position sensor 118 mounted on the gear transmission 47 for detecting a gear position currently selected and a shift depression force sensor 119 as shift operation detecting means for detecting the input of a load to a shift pedal (not shown) are also input into the clutch control portion 112. The clutch control portion 112 drives the first solenoid valve 96a, the second solenoid valve 94a, the third solenoid valve 91a, and the electric motor 85 according to the output signals from these various sensors to thereby perform automatic control of the clutch. For example, when the rider's intention to shifting is detected by the shift depression force sensor 119, the disengagement and reengagement of the clutch 49 can be automatically performed by the clutch control portion 112, thus realizing nonclutch shift such that the operation of the clutch lever 81 is not required.

In the case that the clutch lever 81 is operated by the rider during the operation of this hydraulic clutch driving system, the hydraulic path is shown by the heavy solid line arrows in FIG. 4. More specifically, the electric motor 85 is driven according to the output signal from the stroke sensor 115 for detecting the piston stroke in the clutch master cylinder 82, thereby transmitting the oil pressure from the automatic control master cylinder 84 to the clutch 49. At the same time, the oil pressure from the clutch master cylinder 82 is supplied to the fluid loss simulator 98.

Only when the above-mentioned automatic control system cannot be properly operated, the clutch 49 is driven directly by the operation of the clutch lever 81. In this case, the first, second, and third solenoid valves are brought into their respective initial conditions, or nonenergized conditions, so that the clutch 49 is manually operated through the hydraulic path shown by the broken line arrows.

Figure 5:
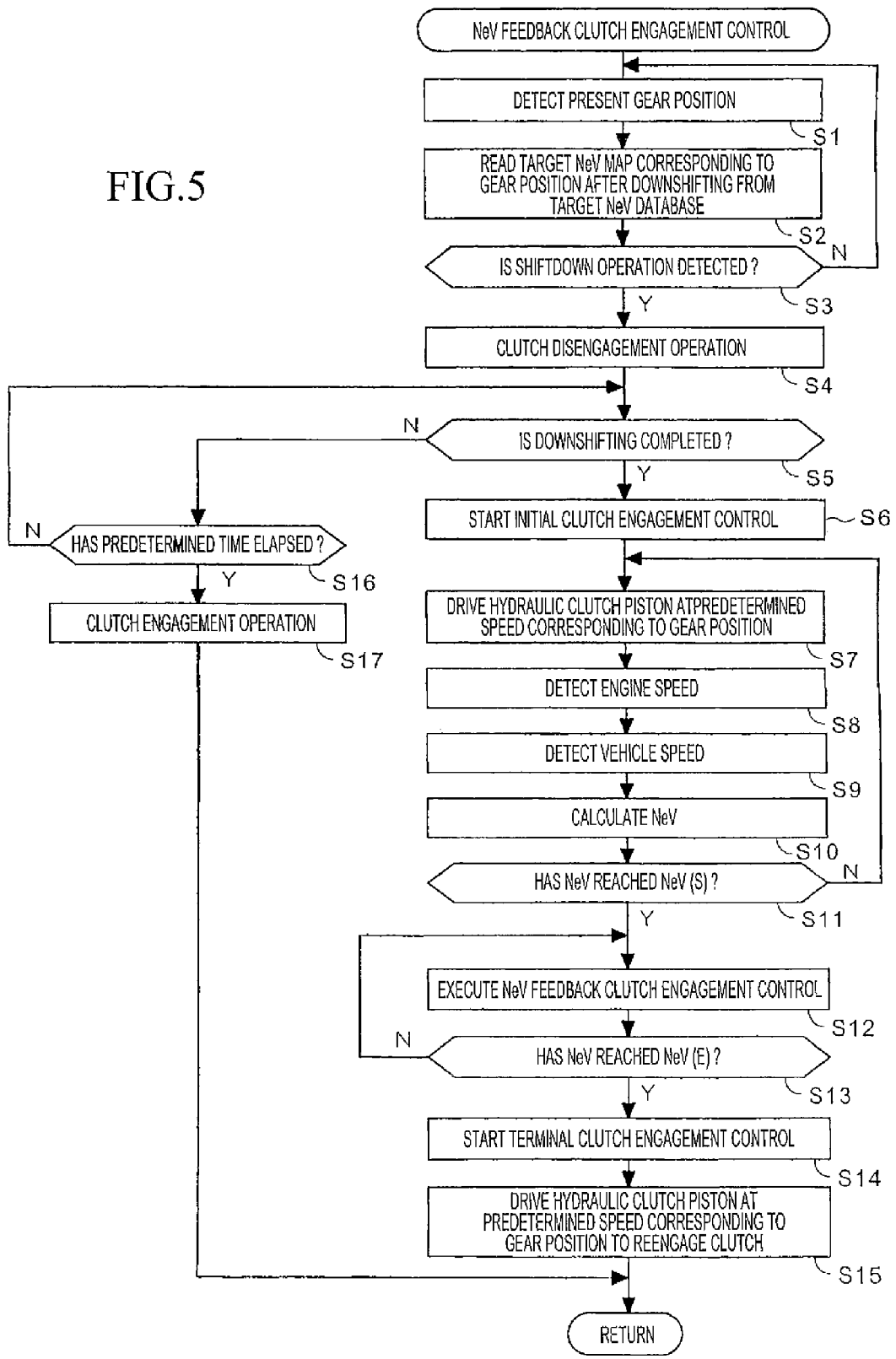
FIG. 5 is a flowchart showing the procedure of NeV feedback clutch engagement control according to this preferred embodiment.

FIG. 5 is a flowchart showing the procedure of NeV feedback clutch engagement control according to this preferred embodiment. This NeV feedback clutch engagement control is the control for reducing the shift shock due to engine brake in downshifting during automatic control of the clutch, and this procedure is carried out by the clutch control portion 112. In step S1, a present gear position is detected by the gear position sensor 118. In step S2, a target NeV map corresponding to a gear position after downshifting is read from the target NeV database 111. In a sequential type multispeed transmission such that the shift operation is sequentially performed, a gear position after shifting is necessarily determined by a gear position before shifting. Accordingly, in this case, at the time the present gear position is detected, the proper target NeV map can be read.

Figure 6:
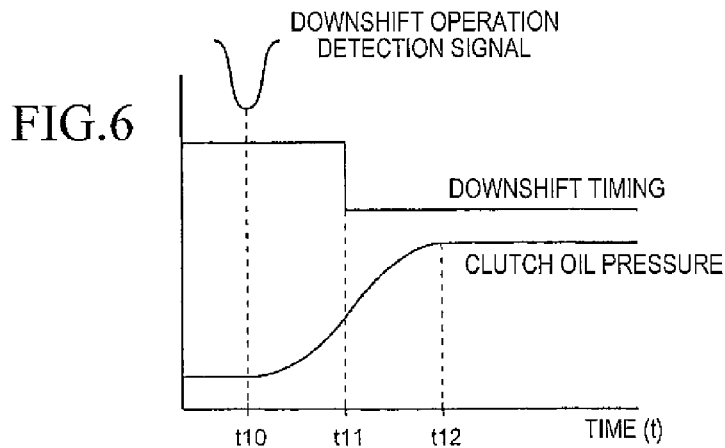
FIG. 6 is a time chart showing the relation among a downshift operation detection signal, downshift timing, and clutch oil pressure.

In step S3, it is determined whether or not a downshift operation has been detected by the shift depression force sensor 119. If the answer in step S3 is affirmative, the program proceeds to step S4 to start a disengagement operation of the clutch 49. Referring to FIG. 6, the clutch disengagement operation is illustrated.

FIG. 6 is a time chart showing the relation among a downshift operation detection signal, downshift timing, and clutch oil pressure. The waveforms showing the downshift operation detection signal, the downshift timing, and the clutch oil pressure can be obtained from the output signals from the shift depression force sensor 119, the gear position sensor 118, and the oil pressure sensor 88, respectively. When the downshift operation detection signal is input from the shift depression force sensor 119 at the time t10, the clutch control portion 112 drives the electric motor 85 to start to operate the automatic control master cylinder 84. As a result, the oil pressure in the clutch operating oil passage is increased to start the disengagement of the clutch 49. At the time t11, a shift operation of the gear transmission 47 can be performed and the downshifting is completed. In this preferred embodiment, even after the completion of downshifting, the clutch 49 is kept in its fully disengaged condition. Accordingly, the automatic control master cylinder 84 is driven until the time t12 when the clutch oil pressure reaches a predetermined upper limit. The clutch disengagement operation shown by the step S4 continues for the time period until the time t12.

When the clutch 49 is disengaged in step S4, the program proceeds to step S5 to determine whether or not the downshift has been completed. This determination is made according to the output signal from the gear position sensor 118. If the answer in step S5 is affirmative, the program proceeds to step S6 to start "initial clutch engagement control" for reengagement of the clutch 49. In step S7, the hydraulic clutch piston 77 is driven in the clutch engaging direction at a predetermined speed corresponding to a gear position. The wording of "a predetermined speed corresponding to a gear position"

used in step S7 means that in a six-speed transmission, for example, five kinds of predetermined speeds respectively corresponding to sixth to fifth speed downshift, fifth to fourth speed downshift, fourth to third speed downshift, third to second speed downshift, and second to first speed downshift may be preliminarily set.

If the answer in step S5 is negative, the program proceeds to step S16 to determine whether or not a predetermined time period has elapsed. If the answer in step S16 is negative, the program returns to step S5, whereas if the answer in step S 16 is affirmative, the program proceeds to step S17 to perform a clutch engagement operation and end this control. According to the processing by the steps S16 and S17, in the case that the downshift has not been completed within the predetermined time period in spite of the fact that the clutch 49 is disengaged after the detection of the rider's intention to downshifting, the clutch 49 is quickly reengaged to thereby cope with an improper shift operation by the rider or any trouble in the gear transmission 47, for example.

In step S8, an engine speed (Ne) is detected according to the output signal from the engine speed sensor 116. In step S9, a vehicle speed (V) is detected by the vehicle speed sensor 117. In step S10, NeV is calculated as a value obtained by dividing the engine speed by the vehicle speed. NeV is always calculated during running of the motorcycle 1. In step S11, it is determined whether or not the present value for NeV calculated in step S10 has reached NeV(S). The relation among NeV, NeV(S), and NeV(E) to be hereinafter described is shown in FIG. 7.

Figure 7:
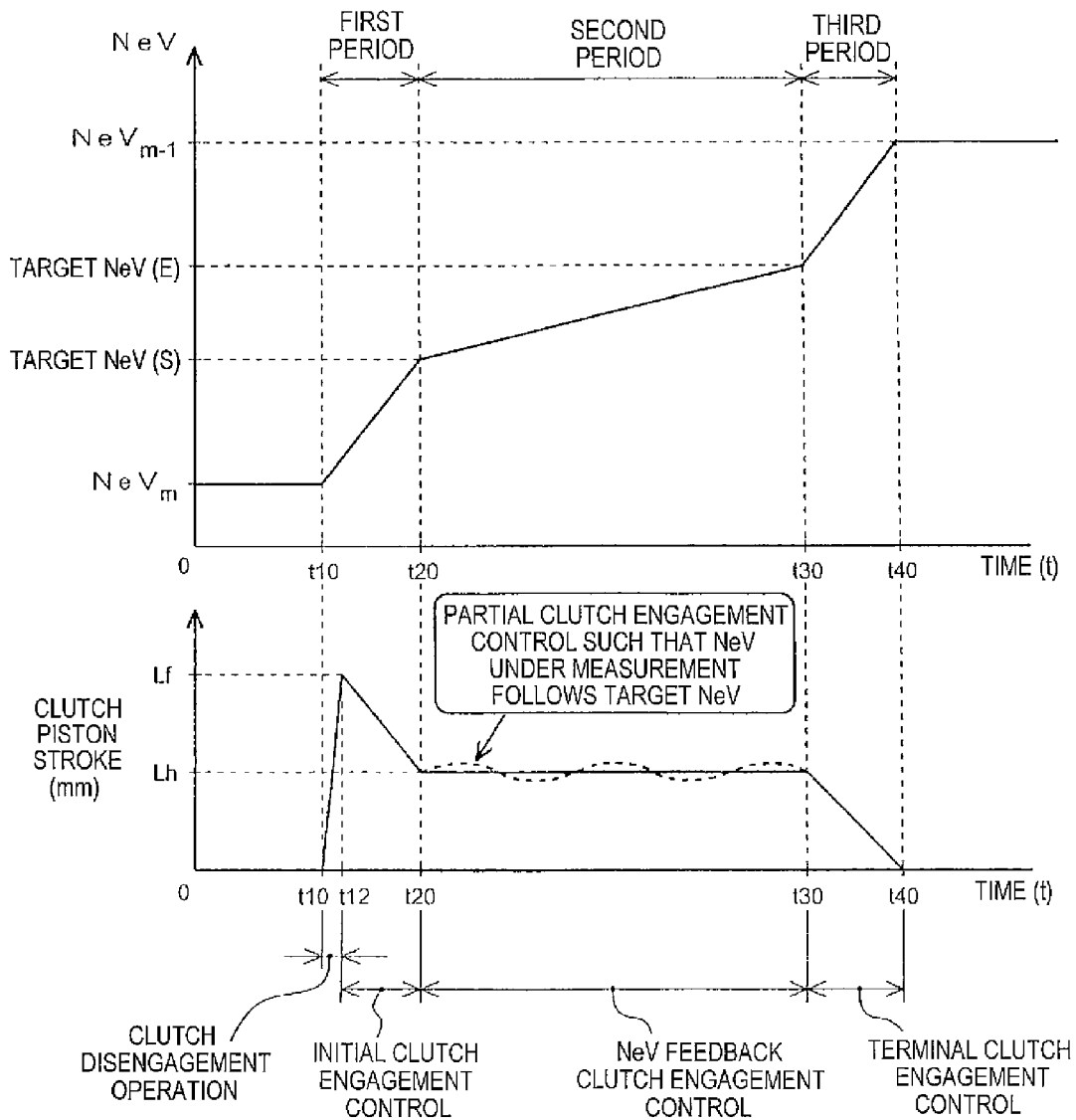
FIG. 7 is a graph showing an ideal varying condition of NeV in downshifting.

FIG. 7 is a graph showing an ideal varying condition of NeV in downshifting. The clutch control device according to the present invention drives the electric motor 85 so that variations in NeV between NeVm (e.g., third speed) before downshifting and NeVm-1 (e.g., second speed) after downshifting become a optimum condition along the solid line composed of a first period from the time t10 to the time t20, a second period from the time t20 to the time t30, and a third period from the time t30 to the time t40 as shown in FIG. 7, in order to reduce the shift shock due to back torque in downshifting. Furthermore, feedback control is performed in the second period so that the NeV under measurement follows the target NeV map for each gear position as stored in the target NeV database 111 (see FIG. 4).

The target NeV map predetermines an ideal varying condition of NeV between NeV(S) at a start point and NeV(E) at an end point. In downshifting such that back torque due to strong engine brake is produced, the motorcycle 1 is usually in its decelerated condition and the throttle is closed, so that when the clutch is driven in the engaging direction, the value for NeV increases with an increase in engine speed, whereas when the clutch is driven in the disengaging direction, the value for NeV decreases with a decrease in engine speed. The first period is a period from the time when the disengagement operation of the clutch is started to the time when the disengagement of the clutch has been completed and the clutch 49 starts to be reengaged to reach a partially engaged condition. The second period is a period during which the partially engaged condition is maintained. The third period is a period from the time when the clutch 49 in the partially engaged condition starts to be driven in the engaging direction to the time when the reengagement of the clutch 49 is completed.

Referring back to the flowchart shown in FIG. 5, if the answer in step S11 is affirmative, that is, if the NeV under measurement has reached NeV(S), the program proceeds to step S12 to perform NeV feedback clutch engagement control. In step S13, it is determined whether or not the NeV Linder measurement has reached NeV(E). If the answer in step S13 is negative, the program returns to step S12, whereas if the answer in step S13 is affirmative, the program proceeds to step S14 to start terminal clutch engagement control. In step S15, the hydraulic clutch piston 77 is driven at a predetermined speed corresponding to a gear position to complete the reengagement of the clutch, thus ending this control processing.

The procedure shown above will now be reexamined in contrast to the graph showing variations in stroke of the hydraulic clutch piston 77 in FIG. 7. When the shift operation is detected at the time t10 in FIG. 7, the "clutch disengagement operation" is performed by driving the electric motor 85 until the time t12 when the stroke of the hydraulic clutch piston 77 reaches a predetermined stroke Lf to realize a predetermined clutch oil pressure. Next, the "initial clutch engagement control" is started so that the hydraulic clutch piston 77 is driven in the clutch engaging direction at a predetermined speed corresponding to a gear position. When the value for NeV under measurement reaches NeV(S), the NeV feedback clutch engagement control is started to maintain a partially engaged condition of the clutch 49 so that the present NeV follows the target NeV map. When the value for NeV reaches NeV(E), the terminal clutch engagement control is started so that the hydraulic clutch piston 77 is driven at a predetermined speed corresponding to a gear position. Finally, the reengagement of the clutch 49 is completed at the time t40. The conditions for execution of the NeV feedback clutch engagement control may further include a fully closed condition of the throttle according to the output signal from the throttle grip angle sensor 114 and a predetermined value or more of the output from the front wheel brake oil pressure sensor 113. Further, these execution conditions may be set for each gear position.

Figure 8:
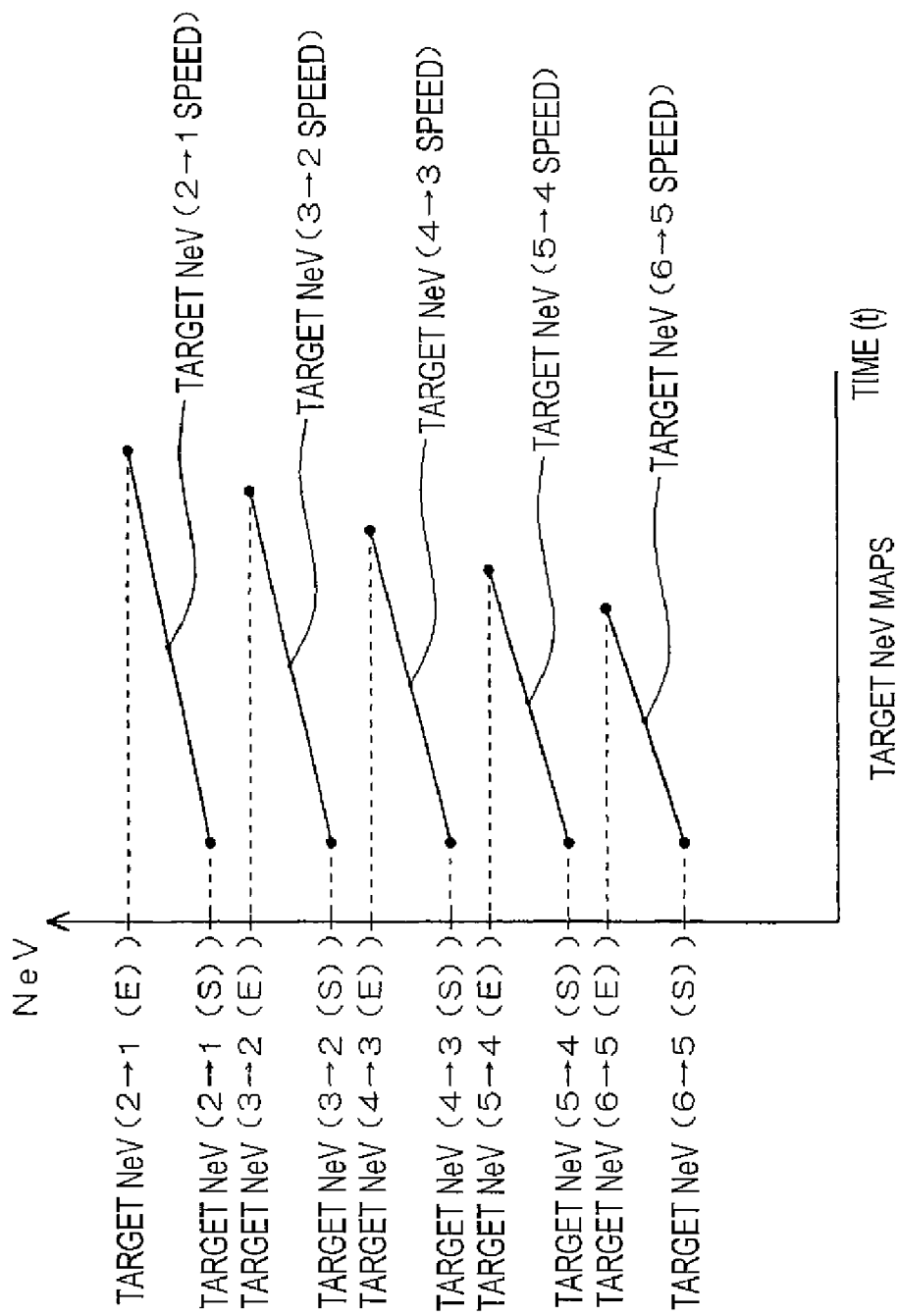
FIG. 8 is an example of the target NeV maps stored in a target NeV database.

FIG. 8 shows an example of the target NeV maps stored in the target NeV database 111 mentioned above. In this preferred embodiment adopting a sequential type six-speed transmission, five kinds of target NeV maps respectively corresponding to five patterns of downshift operations are stored. Each target NeV map is shown by a straight line connecting NeV(S) and NeV(E) as shown in FIG. 8. As a modification, each target NeV map may be formed by a curved line or a broken line, for example, according to optimum values obtained by experiment or the like. In the clutch engagement control according to this preferred embodiment, feedback control is executed according to NeV which is the ratio of an engine speed to a vehicle speed and from which the actual slip ratio of the clutch 49 is obtained. Accordingly, even when the engagement point (meet point) of the clutch changes due to thermal expansion or wear of the clutch disks, a good shift shock reducing effect can be always obtained. Further, the drive speed of the hydraulic clutch piston 77 in the initial clutch engagement control and the drive speed of the hydraulic clutch piston 77 in the terminal clutch engagement control may be set for each gear position. It is to be noted that these drive speeds may be preliminarily stored in the target NeV database 111.

Figure 9A:
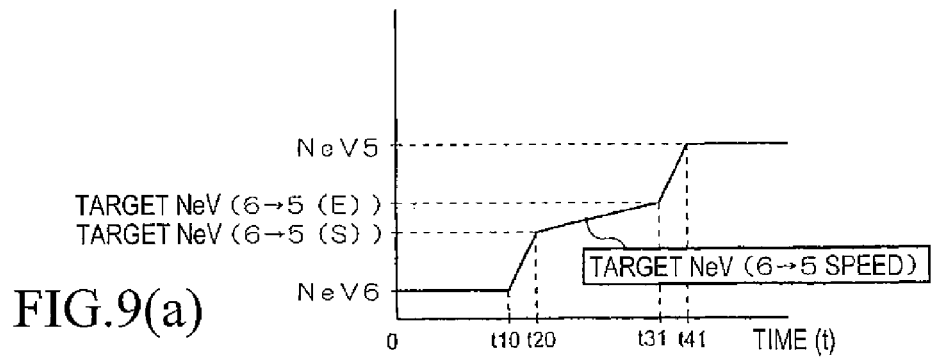
FIGS. 9(a) to 9(e) are graphs showing ideal NeV variations in downshifting.
Figure 9B:
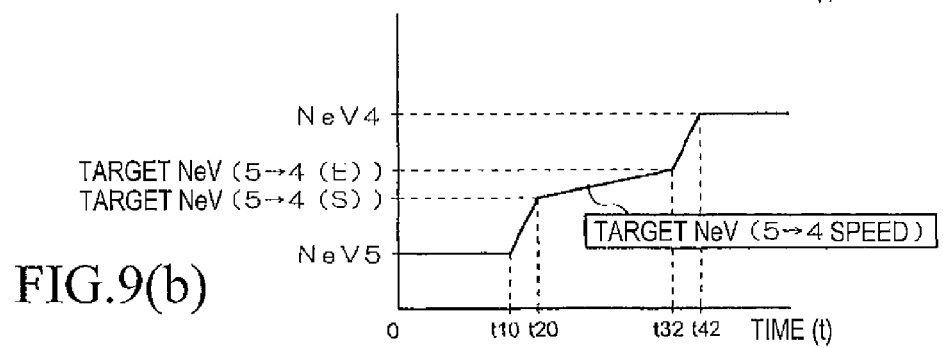
Figure 9C:
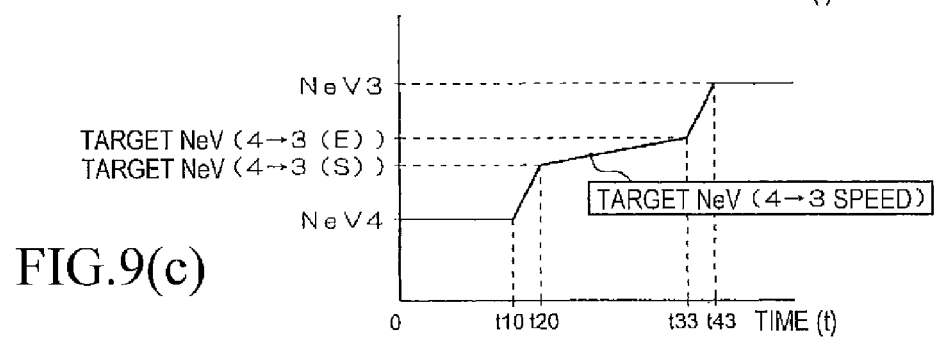
Figure 9D:
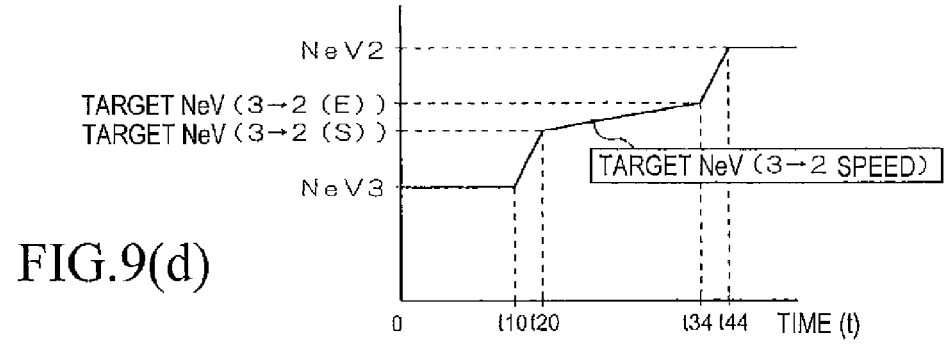
Figure 9E:
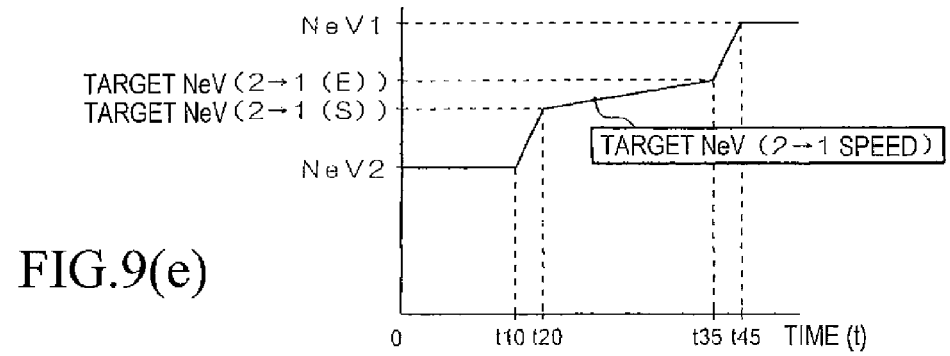

FIGS. 9(a) to 9(e) are graphs showing ideal NeV variations in downshifting, wherein each graph is configured by adding the "initial clutch engagement control" and the "terminal clutch engagement control" set for each gear position to the target NeV map set for each gear position shown in FIG. 8. For example, FIG. 9(d) shows NeV data including the target NeV map adopted in downshifting from the third-speed gear position to the second-speed gear position, wherein when the downshift operation is detected at the time t10, the NeV feedback clutch engagement control is started at the time t20. Thereafter, the terminal clutch engagement control is started at the time t34, and the reengagement of the clutch is completed at the time t44. In this preferred embodiment, the time period of execution of the NeV feedback clutch engagement control is set longer with a decrease in gear position.

Figure 10:
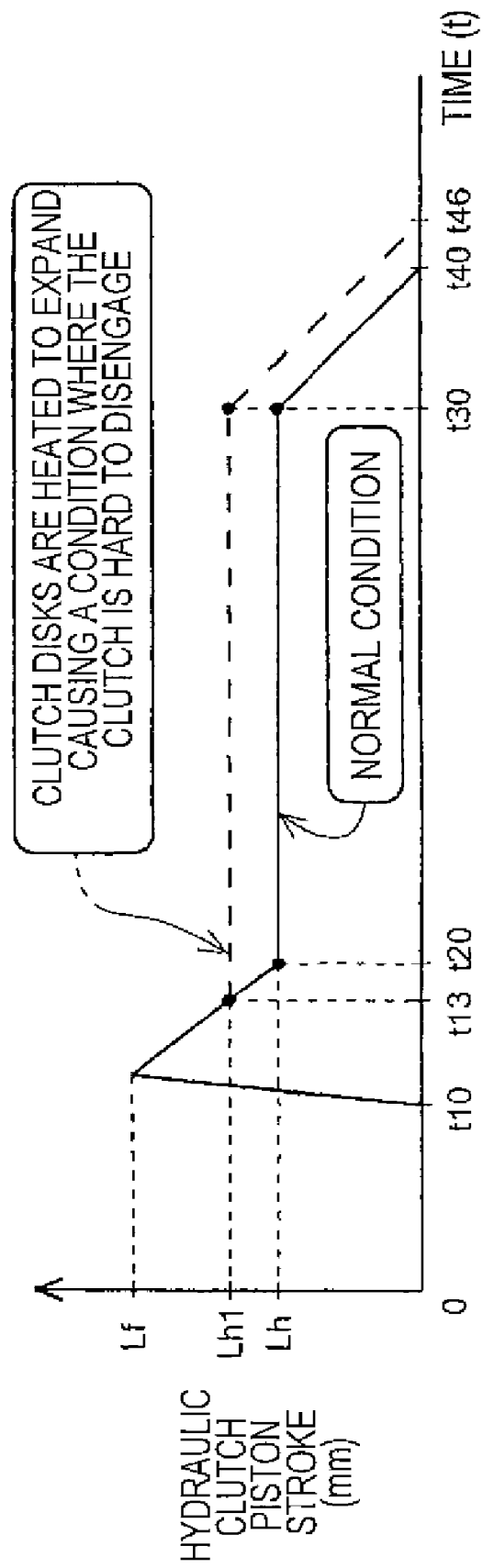
FIG. 10 is a graph showing the stroke of a hydraulic clutch piston in the clutch engagement control.

FIG. 10 is a graph showing the stroke of the hydraulic clutch piston in the clutch engagement control. In particular, FIG. 10 shows a change in the stroke of the hydraulic clutch piston with a change in the condition of the clutch. In the case that the clutch for transmitting a drive force by the friction of the clutch disks is frequently used in the partially engaged condition as in circuit running, there is a possibility that the clutch disks are heated to expand, causing a change in clutch engagement point. As a result, the clutch becomes hard to disengage, for example. In this case, the stroke of the hydraulic clutch piston must be increased more than usual to obtain the same partially engaged condition of the clutch. Referring to FIG. 10, Lh denotes the usual stroke of the hydraulic clutch piston for obtaining the partially engaged condition of the clutch, and Lh1 denotes the increased stroke of the hydraulic clutch piston larger than Lh in the case that the clutch becomes hard to disengage due to thermal expansion of the clutch disks.

In a method of estimating the strength of the engine brake from engine speed and gear position, for example, or determining the partially engaged condition of the clutch according to the stroke of the hydraulic clutch piston, a change in clutch engagement point is not considered, and a shift shock reducing effect similar to that in the normal condition of the clutch cannot therefore be obtained. To the contrary, in the clutch engagement control according to the present invention, feedback control based on NeV as the ratio of engine speed and vehicle speed is performed to thereby always obtain a constant shift shock reducing effect regardless of a change in clutch engagement point.

FIG. 10 shows the condition where the clutch has become hard to disengage. The NeV feedback clutch engagement control is started when the stroke of the hydraulic clutch piston reaches Lh1. The NeV feedback clutch engagement control is changed to the terminal clutch engagement control at the time t30, and the reengagement of the clutch is completed at the time t46. As a modification, the reengagement of the clutch may be completed at the same time t40 as in the normal condition by increasing the piston drive speed in the terminal clutch engagement control as compared with the piston drive speed in the normal condition.

In the clutch control device according to the present invention, the electric motor is feedback-controlled according to the ratio of a present engine speed and a present vehicle speed in reengaging the clutch after downshifting. Accordingly, even when the engagement point (meet point) of the clutch changes due to thermal expansion or wear of the clutch disks, a good shift shock reducing effect can be always obtained. Further, the clutch engagement control map is set for each gear position, so that optimum clutch engagement control can be executed for each gear position. Further, the clutch engagement control map can be arbitrarily set, so that it is possible to execute optimum clutch engagement control responsive to changes in weight of the vehicle and rider and changes in tire grip force due to tire wire, road surface temperature, etc.

It should be noted that the structure and shape of equipment constituting the clutch system and the number and shape of the target NeV maps stored in the target NeV database are not limited to those described in this preferred embodiment, but various modifications may be made. Further, while the clutch control device according to the present invention is applied to a hydraulic clutch in this preferred embodiment, the present invention is applicable to various clutch systems for a four-wheel vehicle or ATV such that a clutch for a multispeed transmission is driven by an actuator.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch control device having a clutch provided between an engine and a transmission for connecting and disconnecting a drive force to the transmission, an electric motor for driving said clutch, and a shift operation sensor for detecting a shift operation by a rider, said clutch control device comprising:

engine speed sensor for detecting an engine speed;

a vehicle speed sensor for detecting a vehicle speed according to said engine speed after a primary speed reduction by said transmission has been detected; and a clutch control portion for disengaging said clutch when a downshift operation by said rider is detected by said shift operation sensor, and for performing feedback control of said electric motor so that a ratio (NeV) of said an engine speed and said vehicle speed becomes a predetermined target value in reengaging said clutch after completing the downshift operation of said transmission, wherein a time period from a time when the downshift operation is detected by said shift operation sensor to a time when said clutch is reengaged after completing the downshift operation of said transmission comprises:

a first period from a time (t10) when the disengagement operation of said clutch is started to a time (t20) when said clutch is driven in an engaging direction at a predetermined speed corresponding to a gear position after completion of the disengagement operation of said clutch until a partially engaged condition of said clutch is reached;

a second period during which said partially engaged condition is maintained by said feedback control; and a third period from a time (t30) when said clutch in said partially engaged condition starts to be driven in the engaging direction at a predetermined speed corresponding to a new gear position to a time (t40) when the reengagement of said clutch is completed;

the ratio of said engine speed to said vehicle speed reaches a first predetermined ratio (NeV (E)) at the time (t20) when said clutch is driven in the engaging direction at the predetermined speed corresponding to the gear position;

the ratio of said engine speed to said vehicle speed reaches a second predetermined ratio (NeV (S)) higher than said first predetermined ratio (NeV (E)) at the time (t30) when said clutch in said partially engaged condition starts to be driven in the engaging direction at the predetermined speed corresponding to the new gear position;

said second period being started at the time (t20) when the ratio of said engine speed to said vehicle speed has reached the first predetermined ratio (NeV (E)) and ended at the time (t30) when the ratio of said engine speed to said vehicle speed has reached the second predetermined ratio (NeV (S)) higher than said first predetermined ratio (NeV (E)).

2. The clutch control device according to claim 1,
wherein said predetermined target value is set by a clutch engagement control map showing variations in the ratio (NeV) of said engine speed to said vehicle speed with an elapse of time, and
said clutch engagement control map being provided for each of multiple target gear positions.

3. The clutch control device according to claim 1, wherein said clutch control portion includes a clutch lever operatively connected to a fluid loss simulator unit provided with a fluid loss simulator, a first solenoid and a second solenoid,
said first solenoid including a first solenoid valve for operatively connecting and disconnecting hydraulic fluid to the fluid loss simulator based on an actuation of the clutch lever, and
said second solenoid including a second solenoid valve for operatively connecting and disconnecting the hydraulic fluid according to a drive signal input from the clutch control unit.

4. The clutch control device according to claim 3, wherein said fluid loss simulator includes a fluid loss simulator hydraulic piston disposed within a chamber, a push member for transmitting a sliding operation of the fluid loss simulator hydraulic piston and an elastic member adapted to be pushed by the push member,
wherein when a hydraulic fluid pressure is applied to said fluid loss simulator the fluid loss simulator hydraulic piston is slid to deform the elastic member and an elastic force generated as a resultant force against the deformation of the elastic member functions to resist the operation of the clutch lever.

5. The clutch control device according to claim 4, wherein when the clutch lever is actuated during normal operating conditions, the clutch is controlled by the hydraulic fluid supplied by actuation of the electric motor, the electric motor actuated by an automatic control from the clutch control, and a resultant force generated by the fluid loss simulator provides a rider with resistance to a clutch operation.

6. The clutch control device according to claim 5, wherein the electric motor is operatively connected to an automatic control master cylinder for supplying the hydraulic fluid to a third solenoid for connecting and disconnecting the hydraulic fluid to selectively impart the hydraulic fluid to the clutch.

7. The clutch control device according to claim 6, wherein output signals from a front wheel brake hydraulic fluid pressure sensor, a throttle grip angle sensor, a piston stroke sensor for detecting a stroke of a hydraulic clutch piston, a stroke sensor for detecting a stroke of a clutch master cylinder, output signals from a gear position sensor mounted on the transmission for detecting gear position currently selected, and a shift depression force sensor as the shift operation sensor for detecting an input of a load to a shift pedal are inputted to the clutch control portion for driving the first solenoid, the second solenoid, the third solenoid and the electric motor for performing an automatic control of the clutch.

8. The clutch control device according to claim 1, wherein the clutch control portion includes an engine speed divided by a vehicle calculating portion and a target engine speed divided by the vehicle speed database, said clutch control portion being operatively connected to the electric motor for performing clutch engagement control for reducing shift shock in downshifting.

9. A clutch control device comprising:
a clutch operatively connected to a transmission for connecting and disconnecting a drive force to the transmission;
an electric motor for driving said clutch;
shift operation sensor for detecting a shift operation by a rider;
an engine speed sensor for detecting an engine speed;
a vehicle speed sensor for detecting a vehicle speed; and
a clutch control portion for disengaging said clutch when a downshift operation by said rider is detected by said shift operation sensor, and for performing feedback control of said electric motor so that a ratio of said engine speed and said vehicle speed becomes a predetermined target value in reengaging said clutch after completing the downshift operation of said transmission,
wherein a time period from a time when the downshift operation is detected by said shift operation sensor to a time when said clutch is reengaged after completing the downshift operation of said transmission comprises:
a first period from a time (t10) when the disengagement operation of said clutch is started to a time (t20) when said clutch is driven in an engaging direction at a predetermined speed corresponding to a gear position after completion of the disengagement operation of said clutch until a partially engaged condition of said clutch is reached;
a second period during which said partially engaged condition is maintained by said feedback control; and
a third period from a time (t30) when said clutch in said partially engaged condition starts to be driven in the engaging direction at a predetermined speed corresponding to a new gear position to a time (t40) when the reengagement of said clutch is completed;
the ratio of said engine speed to said vehicle speed reaches a first predetermined ratio (NeV (E)) at the time (t20) when said clutch is driven in the engaging direction at the predetermined speed corresponding to the gear position;
the ratio of said engine speed to said vehicle speed reaches a second predetermined ratio (NeV (S)) higher than said first predetermined ratio (NeV (E)) at the time (t30) when said clutch in said partially engaged condition starts to be driven in the engaging direction at the predetermined speed corresponding to the new gear position;
said second period being started at the time (t20) when the ratio of said engine speed to said vehicle speed has reached the first predetermined ratio (NeV (E)) and ended at the time (t30) when the ratio of said engine speed to said vehicle speed has reached the second predetermined ratio (NeV (S)) higher than said first predetermined ratio (NeV (E)).

10. The clutch control device according to claim 9,
wherein said predetermined target value is set by a clutch engagement control map showing variations in the ratio (NeV) of said engine speed to said vehicle speed with an elapse of time, and
said clutch engagement control map being provided for each of multiple target gear positions.

11. The clutch control device according to claim 9, wherein said clutch control portion includes a clutch lever operatively connected to a fluid loss simulator unit provided with a fluid loss simulator, a first solenoid and a second solenoid,
said first solenoid including a first solenoid valve for operatively connecting and disconnecting hydraulic fluid to the fluid loss simulator based on an actuation of the clutch lever, and said second solenoid including a second solenoid valve for operatively connecting and disconnecting the hydraulic fluid according to a drive signal input from the clutch control unit.

12. The clutch control device according to claim 11, wherein said fluid loss simulator includes a fluid loss simulator hydraulic piston disposed within a chamber, a push member for transmitting a sliding operation of the fluid loss simulator hydraulic piston and an elastic member adapted to be pushed by the push member,
wherein when a hydraulic fluid pressure is applied to said fluid loss simulator the fluid loss simulator hydraulic piston is slid to deform the elastic member and an elastic force generated as a resultant force against the deformation of the elastic member functions to resist the operation of a clutch lever.

13. The clutch control device according to claim 12, wherein when the clutch lever is actuated during normal operating conditions, the clutch is controlled by the hydraulic fluid supplied by actuation of the electric motor, the electric motor actuated by an automatic control from the clutch control, and a resultant force generated by the fluid loss simulator provides a rider with resistance to a clutch operation.

14. The clutch control device according to claim 13, wherein the electric motor is operatively connected to an automatic control master cylinder for supplying the hydraulic fluid to a third solenoid for connecting and disconnecting the hydraulic fluid to selectively impart the hydraulic fluid to the clutch.

15. The clutch control device according to claim 14, wherein output signals from a front wheel brake hydraulic fluid pressure sensor, a throttle grip angle sensor, a piston stroke sensor for detecting a stroke of a hydraulic clutch piston, a stroke sensor for detecting a stroke of a clutch master cylinder, output signals from a gear position sensor mounted on the transmission for detecting gear position currently selected, and a shift depression force sensor as the shift operation sensor for detecting an input of a load to a shift pedal are inputted to the clutch control portion for driving the first solenoid, the second solenoid, the third solenoid and the electric motor for performing an automatic control of the clutch.

16. The clutch control device according to claim 9, wherein the clutch control portion includes an engine speed divided by vehicle calculating portion and a target engine speed divided by the vehicle speed database, said clutch control portion being operatively connected to the electric motor for performing clutch engagement control for reducing shift shock in downshifting.

17. A clutch control device having a clutch provided between an engine and a transmission for connecting and disconnecting a drive force to the transmission, an electric motor for driving said clutch, and a shift operation sensor for detecting a shift operation by a rider, said clutch control device comprising:
an engine speed sensor for detecting an engine speed;
a vehicle speed sensor for detecting a vehicle speed according to said engine speed after a primary speed reduction by said transmission has been detected; and
a clutch control portion for disengaging said clutch when a downshift operation by said rider is detected by said shift operation sensor, and for performing feedback control of said electric motor so that a ratio (NeV) of said engine speed and said vehicle speed becomes a predetermined target value in reengaging said clutch after completing the downshift operation of said transmission,
wherein said clutch control portion includes a clutch lever operatively connected to a fluid loss simulator unit provided with a fluid loss simulator, a first solenoid and a second solenoid,
said first solenoid including a first solenoid valve for operatively connecting and disconnecting hydraulic fluid to the fluid loss simulator based on an actuation of the clutch lever, and
said second solenoid including a second solenoid valve for operatively connecting and disconnecting the hydraulic fluid according to a drive signal input from the clutch control unit.

18. The clutch control device according to claim 17, wherein a time period from a time when the downshift operation is detected by said shift operation sensor to a time when said clutch is reengaged after completing the downshift operation of said transmission comprises:
a first period from a time (t10) when the disengagement operation of said clutch is started to a time (t20) when said clutch is driven in an engaging direction at a predetermined speed corresponding to a gear position after completion of the disengagement operation of said clutch until a partially engaged condition of said clutch is reached;
a second period during which said partially engaged condition is maintained by said feedback control; and
a third period from a time (t30) when said clutch in said partially engaged condition starts to be driven in the engaging direction at a predetermined speed corresponding to a new gear position to a time (t40) when the reengagement of said clutch is completed;
the ratio of said engine speed to said vehicle speed reaches a first predetermined ratio (NeV (E)) at the time (t20) when said clutch is driven in the engaging direction at the predetermined speed corresponding to the gear position;
the ratio of said engine speed to said vehicle speed reaches a second predetermined ratio (NeV (S)) higher than said first predetermined ratio (NeV (E)) at the time (t30) when said clutch in said partially engaged condition starts to be driven in the engaging direction at the predetermined speed corresponding to the new gear position;
said second period being started at the time (t20) when the ratio of said engine speed to said vehicle speed has reached the first predetermined ratio (NeV (E)) and ended at the time (t30) when the ratio of said engine speed to said vehicle speed has reached the second predetermined ratio (NeV (S)) higher than said first predetermined ratio (NeV (E)).

* * * * *